Patented Apr. 24, 1945

2,374,581

UNITED STATES PATENT OFFICE 2,374,581

SLOW SETTING CEMENT

Levi S. Brown, Claverack, N. Y., assignor to Lone Star Cement Corporation, New York, N. Y., a corporation of Maine No Drawing. Application February 1, 1940,
Serial No. 316,763

3 Claims. (Cl. 106—89)

This invention relates to Portland or Portland type cements with retarded setting rates and to methods of retarding the rate of set of these cements, especially when they are to be subjected to temperatures above normal during the period of setting, such as in the cementing of oil wells.

Ordinary Portland cement, when mixed with water to form a paste and subjected to elevated temperatures, begins to hydrate immediately, and sets sufficiently to prevent the easy deformation of the paste in so short a time that its utility in the cementing of deep oil wells and similar work is greatly impaired.

In the cementing of oil wells and similar operations, it is customary to mix Portland cement with about 40% to 50% of water by weight, to introduce this grout or slurry into the well, and to pump it to the place where it is desired to harden. In present oil well drilling practice, with many wells 6,000–12,000 feet or more in depth, long periods of time are often required for pumping, and high temperatures are encountered which greatly accelerate the setting of the cement. Furthermore, in the customary practice of pumping the grout down through the well casing and then forcing it upward around the end of the casing to the position where it is to harden, the grout is required to pass through narrow channels which tend to prevent final placement if premature stiffening of the grout has taken place. It is a prime requisite of cements for such use that they have the property of remaining pumpable for long periods of time at elevated temperatures before setting begins.

It is also important in oil well cementing to have a cement of sufficient fineness to avoid separation of cement from the water in the grout. Both early strength and ability to retain mixing water are increased with increases in fineness of the cement. Increases in fineness, however, also increase the setting rate of the cement because of the increase in reactive surface of a given weight of cement. A particular problem in oil well and similar cements, therefore, has been the production of a cement which could be finely ground and still have a sufficiently prolonged rate of hydration to enable a grout to be pumped to the desired location in a deep oil well.

One object of my invention is the provision of finely ground Portland cement capable of setting with a high strength but having a prolonged rate of hydration.

A further object is the provision of methods of preparing Portland cements having the foregoing properties.

Another object is the provision of methods of prolonging the rate of hydration of conventional Portland cements even though they may be very finely ground.

A still further object is to provide materials for admixture with Portland cement which are readily dispersed in the mixing water, which render a grout of the cement and water more fluid, and which retard the setting rate of the cement without material impairment of its other physical properties, such as strength and density, after set has taken place.

I have discovered, in a study of cement hydration, that small amounts of certain substances added to cement, the mixing water or to a mixture of cement and water greatly retard the rate of stiffening or set of cement slurries at elevated temperatures. However, after set has begun, the rate of setting is rapid so that the early strength is comparable with that of a normal paste. These retarding agents include tartaric acid, tartrates and the bicarbonates. These agents may be used alone or in combinations with each other and include the relatively water insoluble tartrates as well as those that are readily soluble in water. Tartaric acid and the salts thereof are particularly effective in retarding the rate of setting, and the tartrates, tartaric acid and bicarbonates are also particularly effective in reducing the initial viscosities of cement slurries.

As illustrations to demonstrate the effectiveness of these additions, pumpability tests have been made with them in a "viscosimeter," using three commercial cements which are too rapid in setting action by themselves to be used satisfactorily in oil well cementing where high temperatures are encountered.

For determining time of pumpability of the cement pastes, the cement viscosimeter of the Standard Oil Company of California has been used. This apparatus was described by Silcox and Rule in the July 29, 1935, issue of "Oil Weekly." It is essentially a modified ice cream freezer with one set of stationary and one set of moving paddles in a cylindrical container. The grout, prepared by mixing the cement with 40% by weight of water, is introduced into the container, the side of which is attached to a spring scale to register the tendency of the container to turn due to the viscosity of the grout and its friction on the inside of the container. During the test the paddles are rotated at a constant speed. A 40 ounce pull on the scale is considered to represent the limit of pumpability for the grout in an oil well. The container and grout are heated during the test from 80° to 140° F. during the first hour, after which the temperature is held constant at 140° F. Equal volumes of grout are used for all determinations. Other final temperatures may be used, such as 170° or 200° F.

TABLE I

*Effect of special retarders on properties of cement slurry using 40% water*

| Retarder | Cement "A", initial pull in | Cement "B", viscosimeter | Cement "C", ounces [1] |
|---|---|---|---|
| None | 11 | 10 | 25 |
| .14% sodium bicarbonate | 7 | 8 | 22 |
| .15% tartaric acid | | 4 | |
| .25% tartaric acid | 3 | 3 | 9 |
| .15% cream of tartar | | 3 | |
| .25% cream of tartar | 3 | | 9 |
| .10% tartaric, .05% bicarbonate | | 4 | |
| .10% tartaric, .10% bicarbonate | | 4 | |
| .20% tartaric, .10% bicarbonate | 3 | | 10 |
| .10% calcium tartrate | | 4 | |

TIME OF PUMPABILITY IN MINUTES

| | | | |
|---|---|---|---|
| None | 100 | 90 | 58 |
| .14% sodium bicarbonate | 133 | 144 | 85 |
| .15% tartaric acid | | 295 | |
| .25% tartaric acid | 202 | 300+ | 397 |
| .15% cream of tartar | | 405 | |
| .25% cream of tartar | 425 | | 480+ |
| .10% tartaric, .05% bicarbonate | | 285 | |
| .10% tartaric, .10% bicarbonate | | 338 | |
| .20% tartaric, .10% bicarbonate | 184 | | 348 |
| .10% calcium tartrate | | 364 | |

COMPRESSIVE STRENGTH 24 HRS. 150° F. CURING

| | | | |
|---|---|---|---|
| None | 5,880 | 7,470 | 8,970 |
| .14% sodium bicarbonate | 6,880 | 7,620 | 8,130 |
| .15% tartaric acid | | 7,010 | |
| .25% tartaric acid | 5,380 | | 10,580 |
| .15% cream of tartar | | 5,340 | |
| .25% cream of tartar | 5,820 | | 8,320 |
| .10% tartaric, .05% bicarbonate | | 6,680 | |
| .10% tartaric, .10% bicarbonate | | 6,580 | |
| .20% tartaric, .10% bicarbonate | 6,080 | | 9,260 |
| .10% calcium tartrate | | 6,150 | |

[1] Initial pull is a measure of initial viscosity of the slurry, before appreciable hydration has taken place in the cement paste.
The plus signs indicate that the cement slurries had not reached their limits of pumpability at the end of the times indicated.

The compositions of the commercial cements given in the above table were as follows:

| | Cement "A" | Cement "B" | Cement "C" |
|---|---|---|---|
| | Per cent | Per cent | Per cent |
| $SiO_2$ | 21.76 | 22.09 | 21.14 |
| $Al_2O_3$ | 4.98 | 4.96 | 4.34 |
| $Fe_2O_3$ | 4.38 | 4.51 | 4.51 |
| CaO | 64.81 | 65.18 | 66.12 |
| MgO | 1.51 | 0.62 | 0.67 |
| $SO_3$ | 1.68 | 1.64 | 2.26 |
| Loss | 0.56 | 0.52 | 0.70 |
| Total | 99.68 | 99.52 | 99.74 |
| Free lime | 0.90 | 0.96 | 0.92 |
| Calculated tricalcium aluminate | 5.8 | 5.5 | 3.8 |
| Range of tricalcium aluminate | 4-8 | 0-6 | 0-6 |
| Fineness in terms of square centimeters specific surface per gram of cement | 1,830 | 1,800 | 2,460 |

The range of tricalcium aluminate in the above table indicates the variation in calculated tricalcium aluminate content of these cements due to variations in the process of manufacture.

The presence of gypsum or some similar material in the cement is important in obtaining effective retardation of the setting rate of cements at elevated temperatures in accordance with this invention, and as indicated in the analyses given above and as is well understood in the art, each of these commercial cements contained appreciable quantities of gypsum. The exact amount or proportion of gypsum contained in the cement, however, does not appear to be critical.

The proportion of retarding agent employed according to this invention may be varied considerably, although for economic reasons, it is desirable to employ as small an addition as possible. The minimum quantity of retarding agent that can be used will also vary with the particular retarding agent or combination of agents employed and with the compositions and fineness of the cement to which they are added. With some of the tartrates, amounts as small as 0.05% based on the weight of the dry cement may be used successfully, and an appreciable retarding effect may be obtained in some cases using as little as 0.01 or 0.02% of retarding agent. Amounts greater than 1% of tartaric acid or the salts thereof usually are unnecessary, although in extreme cases an amount of retarding agent up to about 2% of the weight of cement may be employed. In addition to the desirability from the economic point of view of using as little retarding agent as possible, too large an amount of retarding agent may seriously lower the ultimate strength of the cement or adversely affect the viscosity of a water slurry of the cement.

The effect of small additions of tartaric acid, tartrates or bicarbonates in lowering the initial viscosity of a cement and water slurry is especially important in oil well cements because the lower the initial viscosity of such slurries, the easier it is to pump them into an oil well.

It has been found that the addition of a retarding agent according to this invention makes it possible to retard the setting rates of cements with a fineness of from 1500 to 2500 square centimeters per gram sufficiently to make the use of such cements practical in deep oil wells.

The retarding chemical or chemicals may be added to the cement during or after the process of grinding the clinker, or at any other suitable stage in the preparation of the cement. If desired, the retarding chemical or chemicals may be incorporated in the mixing water or may be mixed into the mixture of cement and water a few minutes after preparation of the paste or slurry. It is preferred to incorporate the retarding agent with the dry cement at some stage in the grinding process because of the uniformity of distribution of retarding agent throughout the cement that is thus obtained.

By the terms "tartaric acid" and "tartrates" as used in the specification and claims is meant the various isomers as well as the ordinary tartaric acid and salts thereof, including the dextro-, laevo-, and meso- forms as well as racemic mixtures thereof. The term "tartrates" in the appended claim is intended to include tartaric acid.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:
1. A cement composition for cementing oil wells having all of the characteristic properties of Portland cement except for a retarded setting rate, said composition consisting principally of Port- land cement and an effective quantity from 0.01% to about 1% by weight of a bicarbonate to retard the setting rate of said cement at elevated temperatures.

2. A cement composition suitable for cementing deep oil wells containing Portland cement as its principal ingredient and the sole ingredient that hardens upon hydration, and an effective quantity from 0.01% to about 1% of the cement by weight of sodium bicarbonate to retard the setting rate of the cement at elevated temperatures.

3. A method of mixing a cement slurry for cementing an oil well comprising mixing water with a composition containing Portland cement as the sole ingredient that hardens upon hydration, and with an effective amount from 0.01% to about 1% of the cement by weight of a bicarbonate to retard the setting rate of said cement at elevated temperatures.

LEVI S. BROWN.